(12) United States Patent
Phillips et al.

(10) Patent No.: US 12,540,698 B2
(45) Date of Patent: Feb. 3, 2026

(54) PUSH TO CONNECT COUPLING

(71) Applicant: Rain Bird Corporation, Azusa, CA (US)

(72) Inventors: William Tomas Phillips, Tucson, AZ (US); Michael A. McAfee, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 474 days.

(21) Appl. No.: 17/083,698

(22) Filed: Oct. 29, 2020

(65) Prior Publication Data

US 2021/0062948 A1 Mar. 4, 2021

Related U.S. Application Data

(62) Division of application No. 15/872,832, filed on Jan. 16, 2018, now abandoned.

(51) Int. Cl.
| | |
|---|---|
| *F16L 37/091* | (2006.01) |
| *B29C 65/06* | (2006.01) |
| *F16L 21/02* | (2006.01) |
| *F16L 37/084* | (2006.01) |

(52) U.S. Cl.
CPC ........ *F16L 37/091* (2013.01); *B29C 65/0672* (2013.01); *F16L 21/02* (2013.01); *F16L 37/0841* (2013.01); *F16L 2201/80* (2013.01)

(58) Field of Classification Search
CPC ..... F16L 37/091; F16L 37/0841; F16L 21/02; F16L 2201/80
See application file for complete search history.

(56) References Cited

U.S. PATENT DOCUMENTS

| | | | |
|---|---|---|---|
| 365,387 | A | 6/1887 | Klein |
| 2,184,376 | A * | 12/1939 | Beyer ................ F16L 37/091 |
| | | | 277/618 |
| 2,187,217 | A | 1/1940 | Winslow |
| 2,201,372 | A | 5/1940 | Miller |
| 2,570,224 | A | 10/1951 | Fason |
| 2,810,918 | A | 10/1957 | Baker |

(Continued)

FOREIGN PATENT DOCUMENTS

| | | |
|---|---|---|
| CN | 101761719 A | 6/2010 |
| EP | 0032824 A1 | 7/1981 |

(Continued)

OTHER PUBLICATIONS

U.S. Appl. No. 15/872,832; Office Action mailed Jun. 30, 2020, (pp. 1-13).

(Continued)

*Primary Examiner* — Zachary T Dragicevich
*Assistant Examiner* — Fannie Kee
(74) *Attorney, Agent, or Firm* — Fitch, Even, Tabin & Flannery, LLP

(57) ABSTRACT

A quick coupling system where a conduit can be pushed into the coupling to secure and seal the conduit with the coupling includes a gripping ring and a seal. The seal is located outboard of the gripping ring so that the gripping ring does not damage the outer surface of the conduit engaged by the seal. The coupling system also may include a wiper outboard of the seal to clean the outer surface of the conduit as the conduit is inserted into the coupling system.

14 Claims, 10 Drawing Sheets

(56) References Cited

U.S. PATENT DOCUMENTS

| | | | |
|---|---|---|---|
| 2,967,067 A | 1/1961 | Singer | |
| 2,975,799 A | 3/1961 | Stilwell | |
| 3,027,179 A | 3/1962 | Wiltse | |
| 3,384,392 A | 5/1968 | Gilchrist | |
| 3,442,536 A | 5/1969 | Fowler | |
| 3,462,175 A | 8/1969 | Johnson | |
| 3,633,944 A | 1/1972 | Hamburg | |
| 3,731,955 A | 5/1973 | Borsum | |
| 3,837,687 A | 9/1974 | Leonard | |
| 3,874,709 A | 4/1975 | Macdonald | |
| 3,924,877 A * | 12/1975 | Leopold, Jr. | F16L 37/091 285/369 |
| 3,924,882 A | 12/1975 | Ellis | |
| 3,963,268 A | 6/1976 | Widdicombe | |
| 3,989,280 A | 11/1976 | Schwarz | |
| 4,000,919 A * | 1/1977 | Edwards | F16L 37/091 285/354 |
| 4,035,002 A | 7/1977 | Curtin | |
| 4,047,739 A | 9/1977 | Aitken | |
| 4,072,328 A * | 2/1978 | Elliott | F16L 37/091 285/302 |
| 4,073,514 A | 2/1978 | Pate | |
| 4,079,966 A | 3/1978 | Berry | |
| 4,082,326 A | 4/1978 | Bryson | |
| 4,119,335 A | 10/1978 | Rieffle | |
| 4,146,254 A | 3/1979 | Turner | |
| 4,181,329 A * | 1/1980 | Helm | F16L 37/091 285/305 |
| 4,214,586 A | 7/1980 | Mericle | |
| 4,220,359 A | 9/1980 | Evenson | |
| 4,303,263 A | 12/1981 | Legris | |
| 4,304,424 A | 12/1981 | Hansen | |
| 4,326,737 A | 4/1982 | Lehmann | |
| 4,431,216 A | 2/1984 | Legris | |
| 4,466,640 A | 8/1984 | Van Houtte | |
| 4,508,369 A | 4/1985 | Mode | |
| 4,521,037 A | 6/1985 | Knox | |
| 4,537,183 A | 8/1985 | Fogarty | |
| 4,589,689 A | 5/1986 | Regan | |
| 4,593,943 A | 6/1986 | Hama | |
| 4,606,500 A | 8/1986 | Mussler | |
| 4,621,842 A | 11/1986 | Kowal | |
| 4,627,644 A | 12/1986 | Ekman | |
| 4,630,848 A | 12/1986 | Twist | |
| 4,657,286 A | 4/1987 | Guest | |
| 4,660,803 A | 4/1987 | Johnston | |
| 4,676,533 A | 6/1987 | Gerondale | |
| 4,685,706 A | 8/1987 | Kowal | |
| 4,697,831 A | 10/1987 | Thalmann | |
| 4,722,558 A * | 2/1988 | Badoureaux | F16L 37/091 285/39 |
| 4,722,560 A | 2/1988 | Guest | |
| 4,768,538 A | 9/1988 | Mintz | |
| 4,786,089 A | 11/1988 | Mcconnell | |
| 4,801,158 A | 1/1989 | Gomi | |
| 4,804,213 A | 2/1989 | Guest | |
| 4,810,009 A * | 3/1989 | Legris | F16L 37/091 285/348 |
| 4,834,139 A | 5/1989 | Fitzgibbons | |
| 4,919,457 A | 4/1990 | Moretti | |
| 4,946,205 A | 8/1990 | Washizu | |
| 4,946,213 A | 8/1990 | Guest | |
| 5,037,144 A | 8/1991 | Peting | |
| 5,160,175 A | 11/1992 | Yang | |
| 5,176,409 A | 1/1993 | Brooks | |
| 5,230,539 A | 7/1993 | Olson | |
| 5,280,969 A | 1/1994 | Straub | |
| 5,286,066 A | 2/1994 | Yang | |
| 5,316,350 A | 5/1994 | Kollenbrandt | |
| 5,320,326 A | 6/1994 | Ju | |
| 5,332,269 A | 7/1994 | Homm | |
| 5,476,291 A | 12/1995 | Reneau | |
| 5,496,076 A * | 3/1996 | Lin | F16L 37/091 285/348 |
| 5,531,460 A | 7/1996 | Stefansson | |
| 5,551,735 A * | 9/1996 | Takayanagi | F16L 37/091 285/341 |
| 5,564,757 A | 10/1996 | Seabra | |
| 5,586,791 A | 12/1996 | Kirchner | |
| 5,683,120 A | 11/1997 | Brock | |
| 5,695,224 A | 12/1997 | Grenier | |
| 5,709,415 A | 1/1998 | Witter | |
| 5,775,742 A | 7/1998 | Guest | |
| 5,779,284 A | 7/1998 | Guest | |
| 5,799,984 A | 9/1998 | Reynolds, Jr. | |
| 5,806,898 A | 9/1998 | Hollnagle | |
| 5,921,588 A | 7/1999 | Vogel | |
| 6,027,125 A | 2/2000 | Guest | |
| 6,183,022 B1 | 2/2001 | Guest | |
| 6,231,090 B1 | 5/2001 | Fukao | |
| 6,302,451 B1 | 10/2001 | Olson | |
| 6,334,634 B1 | 1/2002 | Osterkil | |
| 6,390,478 B1 | 5/2002 | Sigmundstad | |
| 6,464,266 B1 | 10/2002 | O'Neill | |
| 6,499,771 B1 | 12/2002 | Snyder, Sr. | |
| 6,508,472 B2 | 1/2003 | Omiya | |
| 6,517,124 B1 | 2/2003 | Le Quere | |
| 6,557,638 B2 | 5/2003 | Cunningham | |
| 6,616,193 B2 | 9/2003 | Anderson | |
| 6,641,177 B1 | 11/2003 | Pinciaro | |
| 6,685,230 B1 | 2/2004 | Bottura | |
| 6,722,702 B1 | 4/2004 | Min-Cheol | |
| 6,733,046 B1 | 5/2004 | Rief | |
| 6,769,698 B2 | 8/2004 | Kamiya | |
| 6,877,777 B1 | 4/2005 | Wartluft | |
| 6,880,865 B2 | 4/2005 | Guest | |
| 6,893,050 B2 | 5/2005 | Schiemann | |
| 6,913,292 B2 | 7/2005 | Snyder, Sr. | |
| 6,929,289 B1 | 8/2005 | Guest | |
| 6,988,747 B2 | 1/2006 | Allen | |
| 7,014,225 B1 | 3/2006 | Goodsel | |
| 7,021,672 B2 | 4/2006 | Ericksen | |
| 7,063,789 B2 | 6/2006 | Colby | |
| 7,093,862 B2 | 8/2006 | Muto | |
| 7,093,863 B2 | 8/2006 | Holmes, IV | |
| 7,100,948 B2 | 9/2006 | Guest | |
| 7,104,573 B2 | 9/2006 | Copeland | |
| 7,108,289 B1 | 9/2006 | Holmes, IV | |
| 7,121,593 B2 | 10/2006 | Snyder, Sr. | |
| 7,195,287 B2 | 3/2007 | Wai | |
| 7,201,382 B2 | 4/2007 | Viegener | |
| 7,249,788 B2 | 7/2007 | Muhammad | |
| 7,311,830 B2 | 12/2007 | Colby | |
| 7,328,493 B2 | 2/2008 | Jones | |
| 7,331,613 B2 | 2/2008 | Schulte | |
| 7,347,457 B2 | 3/2008 | Wulf | |
| 7,387,731 B2 | 6/2008 | Colby | |
| 7,410,193 B2 | 8/2008 | Guest | |
| 7,445,247 B2 | 11/2008 | Ericksen | |
| 7,478,840 B2 | 1/2009 | Youssefifar | |
| 7,488,008 B2 | 2/2009 | Hawkins | |
| 7,500,699 B2 | 3/2009 | Snyder, Sr. | |
| 7,506,899 B2 | 3/2009 | Feith | |
| 7,621,569 B2 | 11/2009 | Anthoine | |
| 7,686,346 B1 | 3/2010 | Buccicone | |
| 7,815,225 B2 | 10/2010 | Jones | |
| 7,841,630 B1 | 11/2010 | Auray | |
| 7,862,089 B2 | 1/2011 | Crompton | |
| 7,866,707 B2 | 1/2011 | Sudar | |
| 7,866,710 B2 | 1/2011 | Sheppard | |
| 7,909,369 B2 | 3/2011 | Kertesz | |
| 7,918,486 B2 | 4/2011 | Preisendorfer | |
| 7,954,861 B2 | 6/2011 | Swift | |
| 7,984,931 B2 | 7/2011 | Kertesz | |
| 8,025,318 B1 | 9/2011 | Morroney | |
| 8,205,915 B2 | 6/2012 | Crompton | |
| 8,210,576 B2 | 7/2012 | Crompton | |
| 8,235,427 B2 | 8/2012 | Jones | |
| 8,274,000 B2 | 9/2012 | Smith | |
| 8,398,122 B2 | 3/2013 | Crompton | |
| 8,474,877 B2 | 7/2013 | Smith | |
| 8,480,134 B2 | 7/2013 | Crompton | |
| 8,487,197 B2 | 7/2013 | Smith | |

(56) References Cited

U.S. PATENT DOCUMENTS

| | | |
|---|---|---|
| 8,505,983 B2 | 8/2013 | Hiss |
| 8,534,467 B2 | 9/2013 | Haas |
| 8,608,205 B2 | 12/2013 | Lai |
| 8,628,117 B1 | 1/2014 | Cheng |
| 8,727,382 B2 | 5/2014 | Adrian |
| 8,844,981 B1 | 9/2014 | Crompton |
| 8,894,100 B2 | 11/2014 | Eaton |
| 8,898,876 B2 | 12/2014 | Feith |
| 9,022,432 B2 | 5/2015 | Firestine |
| 9,068,680 B1 | 6/2015 | Crompton |
| 9,074,686 B2 | 7/2015 | Doyle |
| 9,217,529 B2 | 12/2015 | Crompton |
| 9,285,060 B2 | 3/2016 | Griggs, III |
| 9,291,294 B2 | 3/2016 | Lehmann |
| 9,322,496 B1 | 4/2016 | Crompton |
| 9,334,988 B2 | 5/2016 | Gallagher |
| 9,429,262 B2 | 8/2016 | Ericksen |
| 9,534,714 B2 | 1/2017 | Eaton |
| 9,562,637 B1 | 2/2017 | Crompton |
| 9,568,135 B2 | 2/2017 | Lehmann |
| 9,604,404 B2 | 3/2017 | Ericksen |
| 9,611,957 B2 | 4/2017 | Webb |
| 9,664,322 B2 | 5/2017 | Lehmann |
| 9,759,361 B2 | 9/2017 | Vreeken |
| 9,781,866 B2 | 10/2017 | Lei |
| 9,784,393 B2 | 10/2017 | Taylor |
| 9,816,656 B2 | 11/2017 | Crompton |
| 9,845,909 B2 | 12/2017 | Lehmann |
| 9,857,003 B2 | 1/2018 | Bouey |
| 9,863,567 B2 | 1/2018 | Lehmann |
| 9,915,385 B2 | 3/2018 | Eaton |
| 10,213,591 B2 | 2/2019 | Grassl |
| 10,844,988 B2 | 11/2020 | Simon |
| 10,962,157 B2 | 3/2021 | Jacobs |
| 11,060,646 B2 | 7/2021 | Jacobs |
| 11,060,652 B2 | 7/2021 | Belen |
| 11,333,280 B2 | 5/2022 | Firmian |
| 11,402,046 B2 | 8/2022 | Kimura |
| 11,460,133 B2 | 10/2022 | Kuo |
| 11,460,134 B2 | 10/2022 | Simon |
| 11,466,802 B2 | 10/2022 | Lawrence |
| 11,493,159 B2 | 11/2022 | Taylor |
| 11,506,316 B2 | 11/2022 | Simon |
| 11,512,802 B2 | 11/2022 | Schaaf |
| 11,519,532 B2 | 12/2022 | Lee |
| 2002/0038953 A1 | 4/2002 | Mcnab |
| 2002/0135184 A1 | 9/2002 | Snyder |
| 2004/0240940 A1 | 12/2004 | Ericksen |
| 2005/0194785 A1 | 9/2005 | Shemtov |
| 2006/0108802 A1* | 5/2006 | Baumgartner ........ F16L 37/091 285/322 |
| 2006/0152005 A1 | 7/2006 | Kertesz |
| 2008/0149873 A1 | 6/2008 | Cimberio |
| 2008/0157524 A1 | 7/2008 | Jones |
| 2008/0185838 A1 | 8/2008 | Sudar |
| 2009/0001712 A1 | 1/2009 | Webb |
| 2010/0045032 A1 | 2/2010 | Rea |
| 2010/0078937 A1 | 4/2010 | Jones |
| 2010/0225108 A1 | 9/2010 | Mann |
| 2011/0048612 A1 | 3/2011 | Quinn |
| 2011/0138605 A1 | 6/2011 | Swift |
| 2011/0309611 A1 | 12/2011 | Smith |
| 2012/0024409 A1 | 2/2012 | Kunzmann |
| 2012/0074695 A1 | 3/2012 | Salehi-Bakhtiari |
| 2012/0139190 A1 | 6/2012 | Doyle |
| 2012/0161436 A1 | 6/2012 | Salehi-Bakhtiari |
| 2012/0200081 A1 | 8/2012 | Reznar |
| 2013/0341917 A1 | 12/2013 | Lehmann |
| 2015/0054276 A1 | 2/2015 | Alsup |
| 2015/0345683 A1 | 12/2015 | Crompton |
| 2016/0040812 A1 | 2/2016 | Lai |
| 2016/0208966 A1 | 7/2016 | Eilert |
| 2016/0327196 A1 | 11/2016 | Gledhill |
| 2017/0009917 A1 | 1/2017 | Wust |
| 2017/0021723 A1 | 1/2017 | Visarius |
| 2017/0059068 A1 | 3/2017 | Di Giusto |
| 2017/0102102 A1 | 4/2017 | Goble |
| 2017/0114602 A1 | 4/2017 | Grace |
| 2017/0198842 A1 | 7/2017 | Ericksen |
| 2017/0370506 A1 | 12/2017 | Rusch |
| 2018/0119851 A1 | 5/2018 | Bouey |
| 2018/0363815 A1 | 12/2018 | Jacobs |
| 2021/0156502 A1 | 5/2021 | Belen |
| 2021/0207750 A1 | 7/2021 | Jacobs |
| 2021/0388933 A1 | 12/2021 | Belen |
| 2022/0268385 A1 | 8/2022 | Nelson |
| 2022/0316639 A1 | 10/2022 | Kimura |
| 2024/0049659 A1 | 2/2024 | Lutzky |

FOREIGN PATENT DOCUMENTS

| | | |
|---|---|---|
| GB | 2211506 A | 7/1989 |
| JP | H01206196 A | 8/1989 |

OTHER PUBLICATIONS

Hydro-Rain, Pictures of PVC Lock Fitting, publicly available before Jan. 16, 2018 (1 page).
Hydro-Rain, PVC-Lock Brochure 08685-36 Rev A, publicly available before Jan. 16, 2018 (2 pages).
Hydro-Rain, PVC-Lock Brochure 98606-36 Rev B, publicly available before Jan. 16, 2018 (2 pages).
Lasco Fittings, Inc., Lasco Push Fittings Brochure, Pricing Effective Jul. 1, 2017 (2 pages).
Lasco Fittings, Inc., Pictures of 1-inch IPS Pipe, LPC29-010RMC, publicly available before Jan. 16, 2018 (2 pages).
Picture of Product Labeled "T-Blu", 25×25mm, PN 1.6MPA, publicly available before Jan. 16, 2018 (1 page).
U.S. Appl. No. 17/964,741; Final Rejection mailed Oct. 25, 2024; (pp. 1-10).
U.S. Appl. No. 17/964,741; Notice of Allowance and Fees Due (PTOL-85) mailed May 9, 2025; (pp. 1-5).
U.S. Appl. No. 17/964,741; Non-Final Rejection mailed Jan. 30, 2025; (pp. 1-9).

* cited by examiner

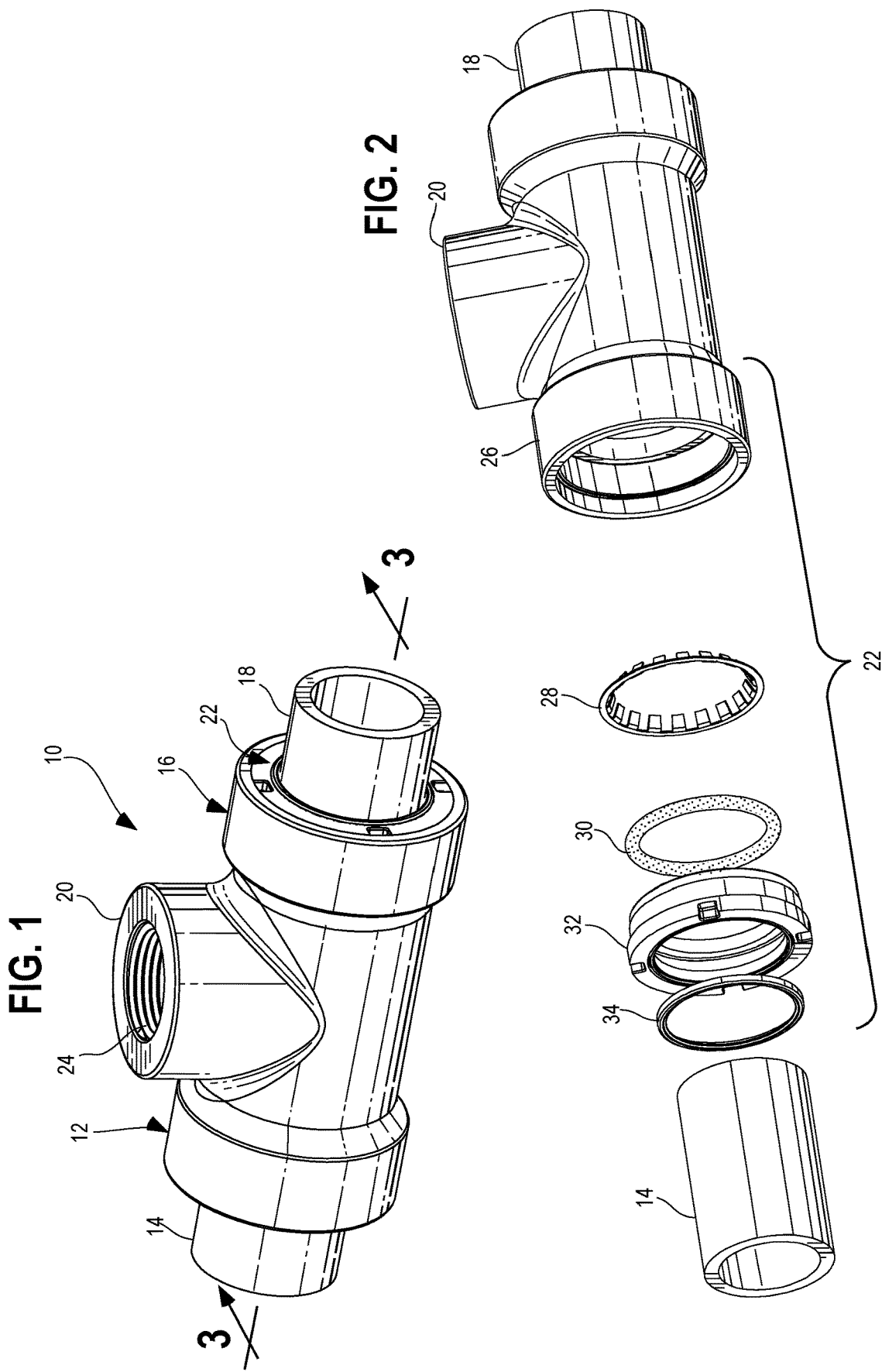

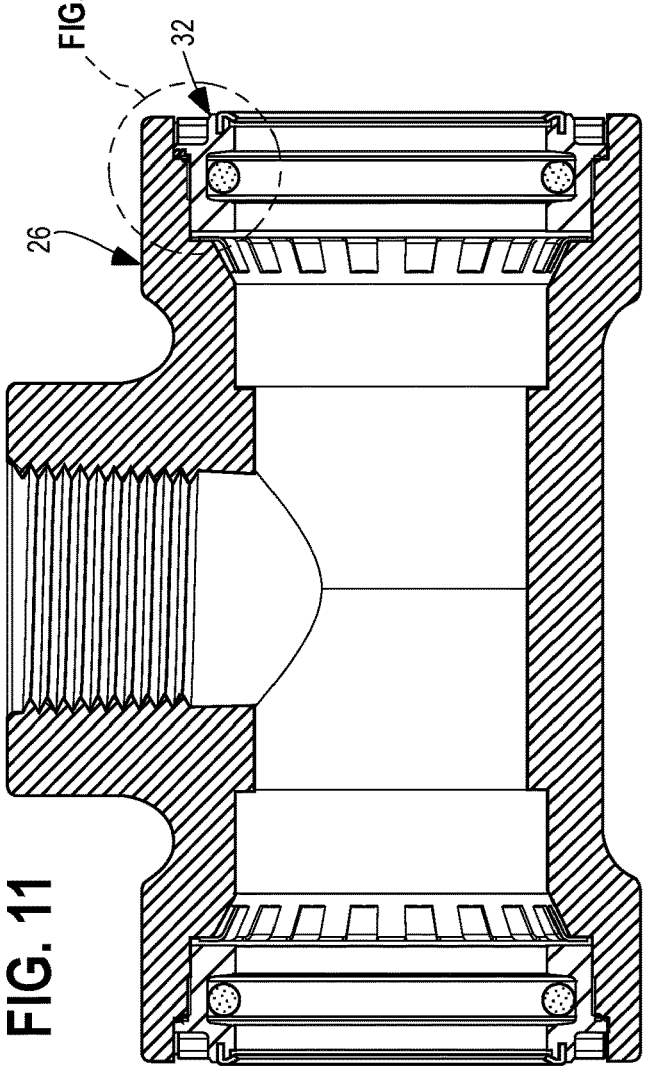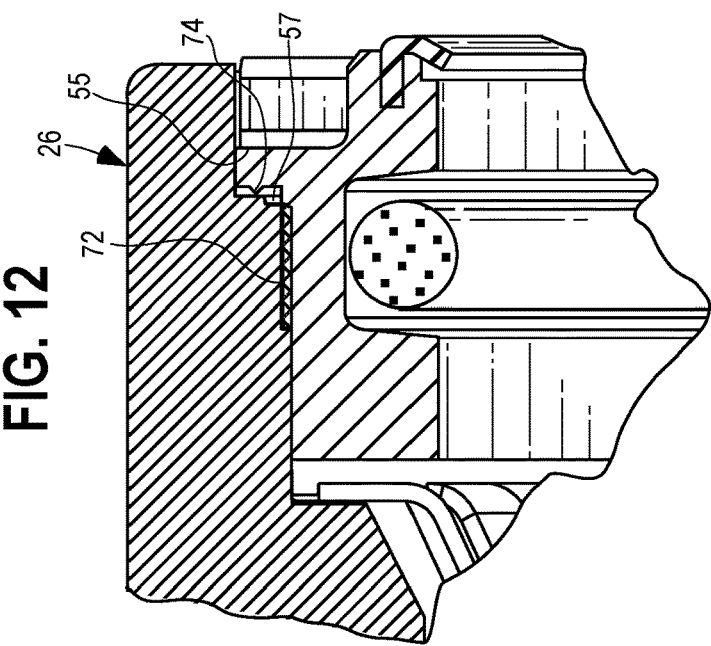

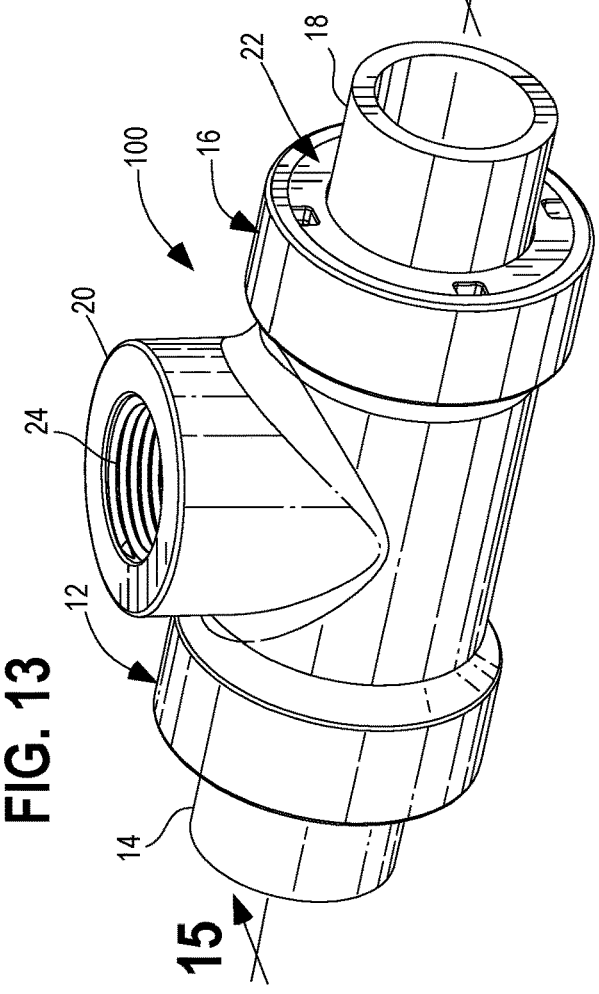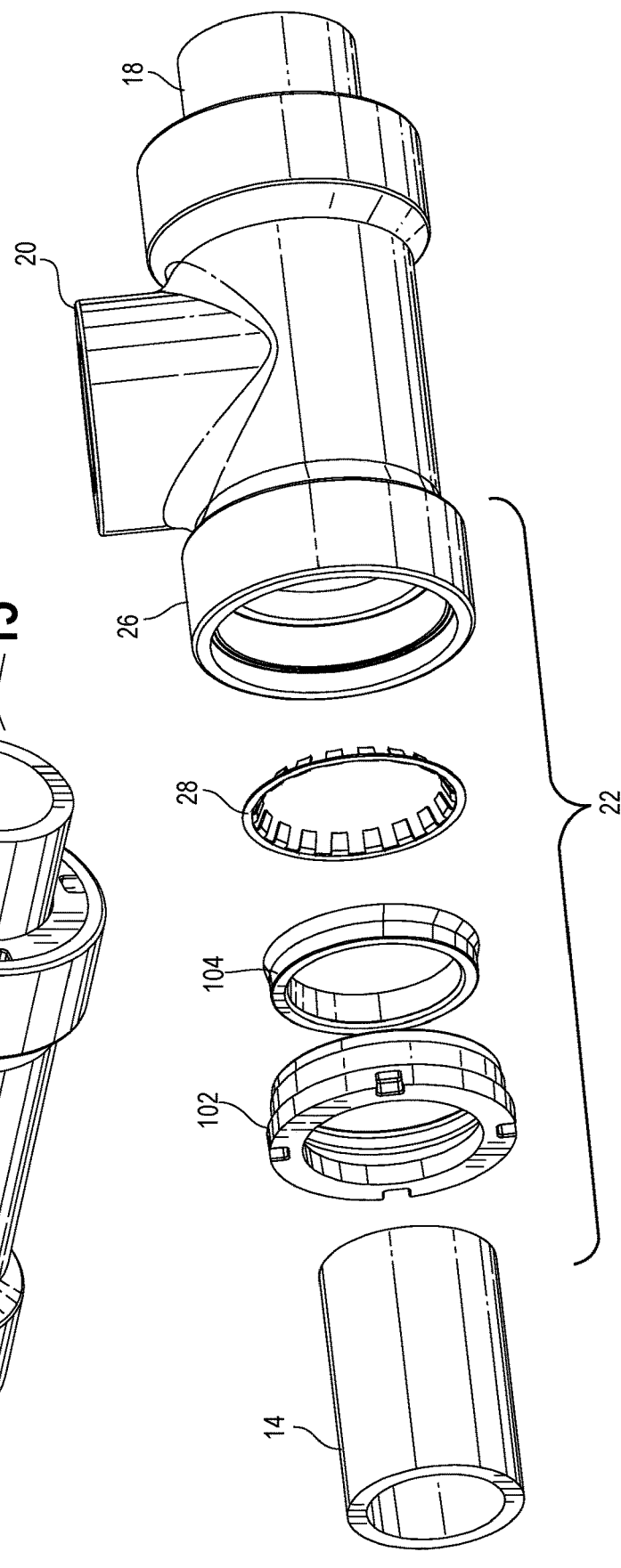

//PUSH TO CONNECT COUPLING

CROSS-REFERENCE TO RELATED APPLICATIONS

This application is a division of and claims priority to prior application Ser. No. 15/872,832, filed Jan. 16, 2018, which is herein incorporated by reference.

FIELD

The present invention pertains to couplings for conduit and, more particularly, to being able to quickly couple segments of conduit together without tooling and adhesive.

BACKGROUND

Irrigation systems can be designed with underground conduit, buried sprinklers that pop-up during irrigation cycles and retract after irrigation cycles, and valves in buried valve boxes. There are many connections that are made between sections of conduit and other components of the irrigation system. These connections are often made by applying primer and glue to PVC piping and fittings. This consumes a lot of time and adds to the overall cost of installing the irrigation system.

One solution has been to use push-to-connect couplings. With these couplings, the conduit is pushed into the coupling, and the coupling automatically secures and seals the conduit to the coupling without any adhesive. These couplings commonly include a gripping ring and a seal. The gripping ring engages the conduit to secure the connection between the coupling and the conduit. The seal provides a watertight seal between the coupling and the conduit.

One shortcoming is that the gripping ring is located outboard of the seal and consequently the gripping ring can score or scratch the outer surface of the conduit. This can negatively impact the effectiveness of the seal. Thus, there is a desire to have push to connect couplings that do not score or scratch the conduit as the coupling is inserted into the coupling.

BRIEF DESCRIPTION OF THE DRAWINGS

FIG. 1 is a perspective view of a coupling connecting conduit segments;

FIG. 2 is an exploded view of one end of the coupling of FIG. 1;

FIG. 11 is a cross-sectional view of the coupling of FIG. 1 in another stage of manufacturing;

FIG. 12 is an enlarged cross-sectional view of the area circled in FIG. 11;

FIG. 13 is a perspective view of an alternate coupling connecting conduit segments;

FIG. 14 is an exploded view of one end of the coupling of FIG. 13;

DETAILED DESCRIPTION

Figure 3:
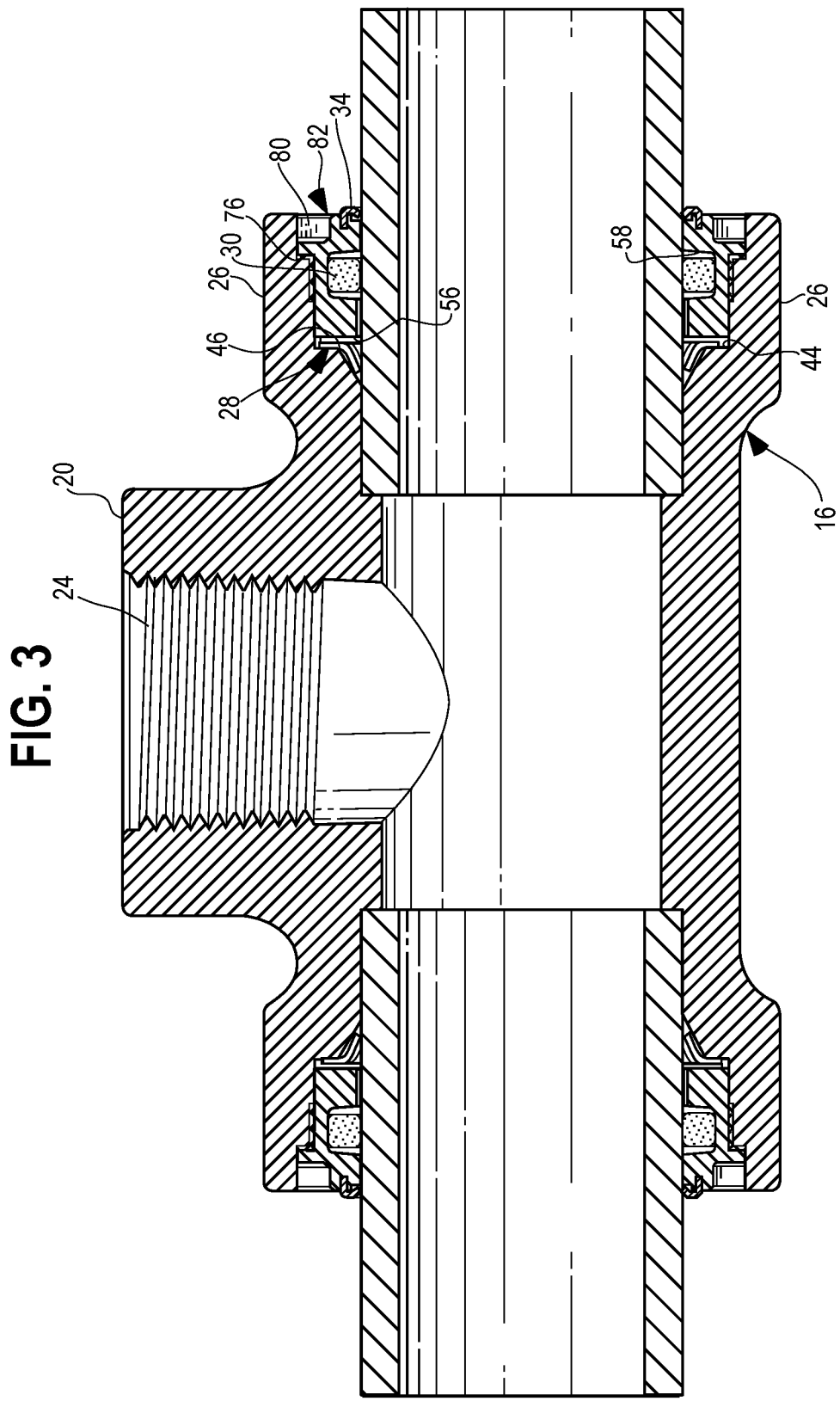
FIG. 3 is a cross-sectional view of the coupling of FIG. 1 taken along line 3-3 of FIG. 1.

With reference to FIGS. 1 and 2, there is illustrated a push to connect coupling 10 in the form of a tee coupling. The quick coupling 10 has a first coupling end 12 attaching a first segment of conduit 14 and second coupling end 16 attaching a second segment of conduit 18. A third coupling end 20 is shown without a segment of conduit. The first and second coupling ends 12, 16 are configured with a quick attachment system 22 described further below.

The quick attachment system 22 enables the first and second segments of conduit 14,18 to be easily secured to and sealed with the coupling 10. The segments of conduit 14,18 need only be pushed into the first and second coupling ends 12,16 for attachment. The attachment system 22 includes a body portion 26, a gripping ring 28, a seal 30, a cap 32 and a wiper 34. The gripping ring may be a toothed ring 28 that secures the connection between the first and second coupling ends 12,16 and the conduit segments 14,18. The seal 30 provides a watertight seal between the first and second coupling ends 12,16 and the conduit segments 14,18. The seal 30 is located outboard of the toothed ring 28, and thus, the toothed ring 28 cannot scratch the surface of the conduit that engages the seal 30. The wiper 34 is further outboard of the seal 30 to clean the surface of the conduit that engages the seal 30. This configuration helps provide a better seal between the quick coupling 10 and the conduit segments 14, 18.

As mentioned above, the quick coupling 10 includes a third coupling end 20. The third coupling end 20 includes internal threads 24 but could be configured with a quick attachment system 22 as well. The quick attachment system 22 is not limited to a tee coupling. It can be implemented in any coupling configuration, including, but not limited to, a straight coupling, an elbow coupling, a Y coupling or manifold type systems with a plurality of couplings. It also can be used in an end cap to close off the end of a conduit.

As illustrated in FIGS. 2 and 3, the components of each quick attachment system 22 are fitted in the body portion 26 of the coupling 10. More specifically, the cap 32 secures the tooth ring 28 and the seal 30 in the body portion 26. The cap 32 can be attached to the body portion 26 in any conventional manner, including, but not limited to, a friction fit, a mechanical interconnection, an adhesive, a sonic weld or a spin weld. The wiper 34 can be attached to the cap 32 in the same ways.

Figure 7:
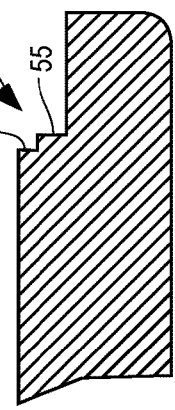
FIG. 7 is an enlarged cross-sectional view of the area of the body circled in FIG. 6.
Figure 6:
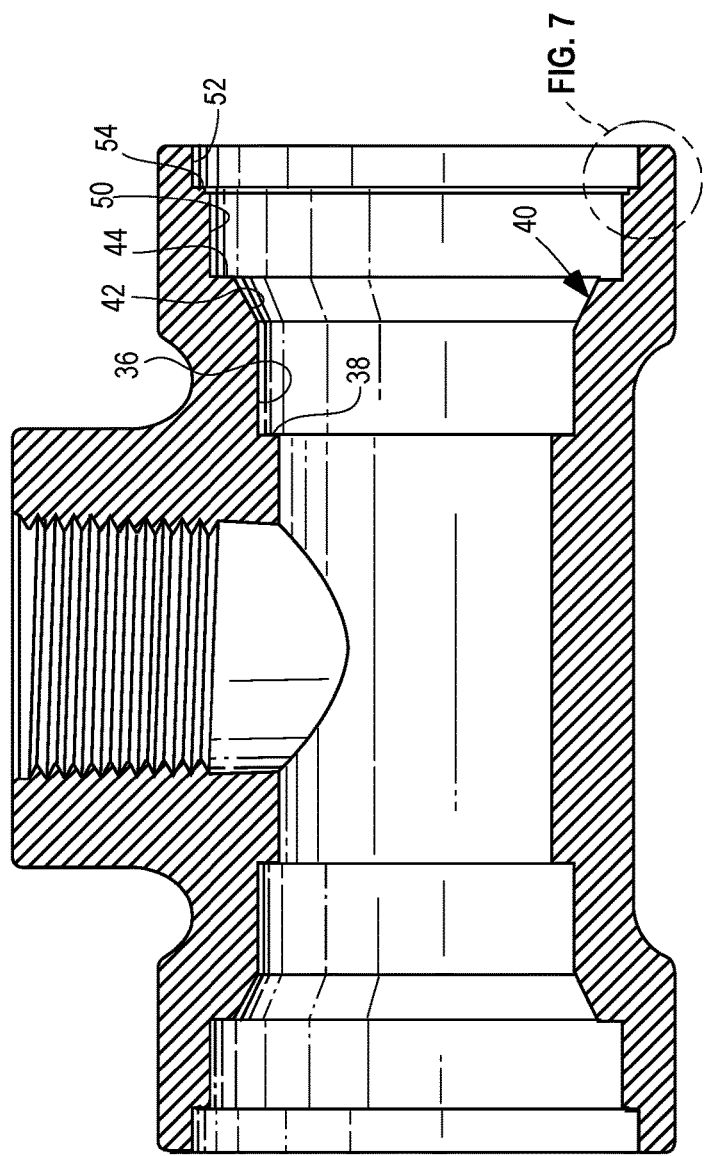
FIG. 6 is a cross-sectional view of a body of the coupling of FIG. 1.

With reference to FIGS. 3 and 6, the body portion 26 includes four segments. The most inboard segment 36 is cylindrical and has a first diameter and terminates with an inboard stop 38. The stop 38 prevents further insertion of a conduit segment into the body portion 26. Progressing in the outboard direction, there is a segment 40 that includes an angled annular ring 42 and a first ledge 44. A ring portion 46 of the toothed ring 28 (FIG. 8) rests on the first angular ledge 44. The toothed ring 28 also includes a plurality of teeth 48 (FIG. 8) that extend along the angled annular ring 42. Then, there is first cap segment 50 that is cylindrical with a second diameter larger than the first diameter and a second cap segment 52 that also is cylindrical with a third diameter larger than the second diameter. A second annular ledge 54 separates the first and second cap segments 50,52. The second annular ledge 54 may be stepped with a raised outer step 55 relative to a raised inner step 57 (FIG. 7). The body portion 26 and cap 32 may be configured so the body portion 26 receives the cap 32 with a friction fit or to facilitate attachment with an adhesive. As explained further below, the body portion 26 and cap 32 may be configured for sonic or spin welding. The body portion may be made of acrylonitrile butadiene styrene.

Figure 8:
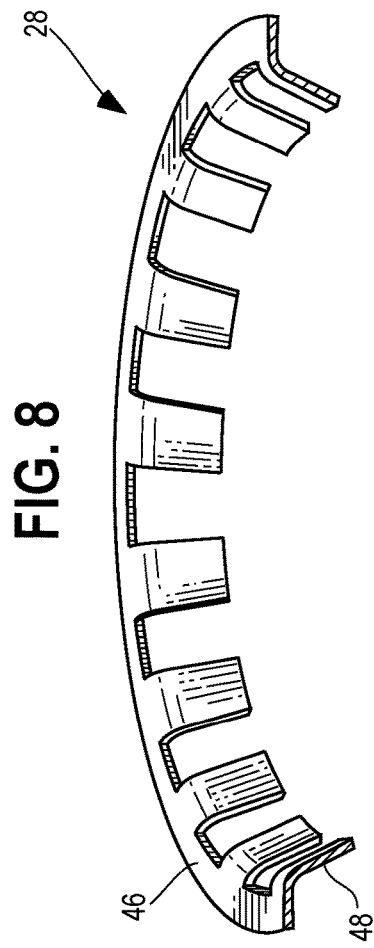
FIG. 8 is a perspective cross-sectional view of a gripping ring of the coupling of FIG. 1.
Figure 9:
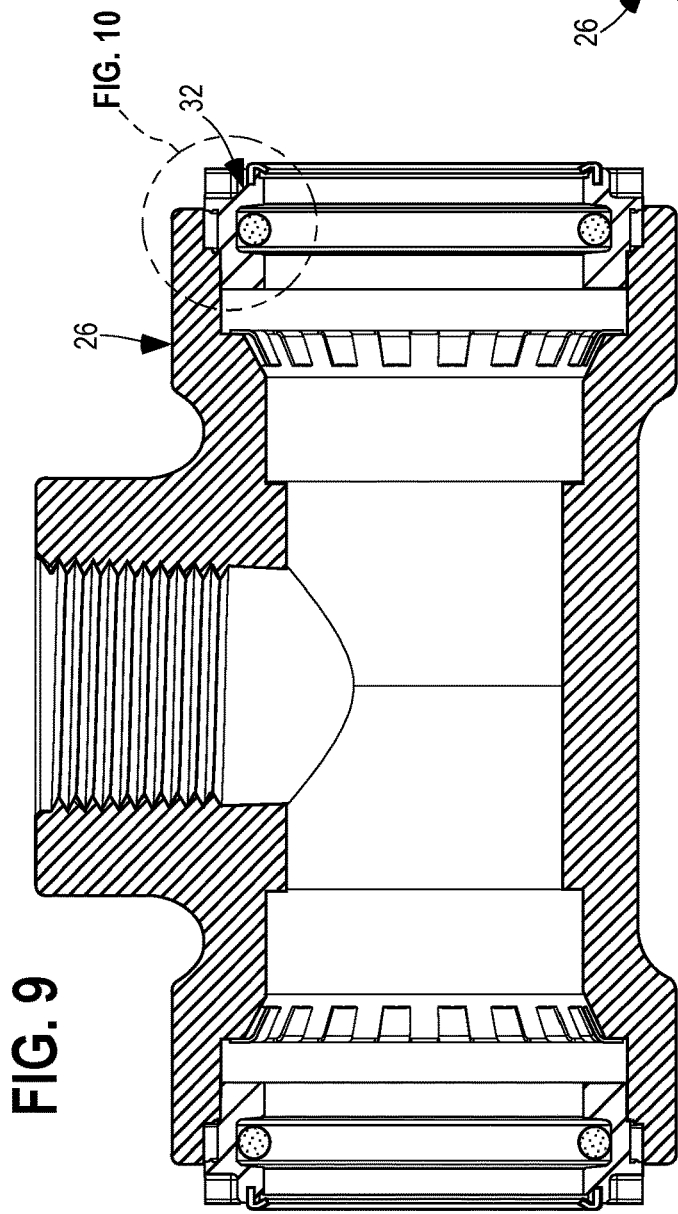
FIG. 9 is a cross-sectional view of the coupling of FIG. 1 in one stage of manufacturing.
Figure 10:
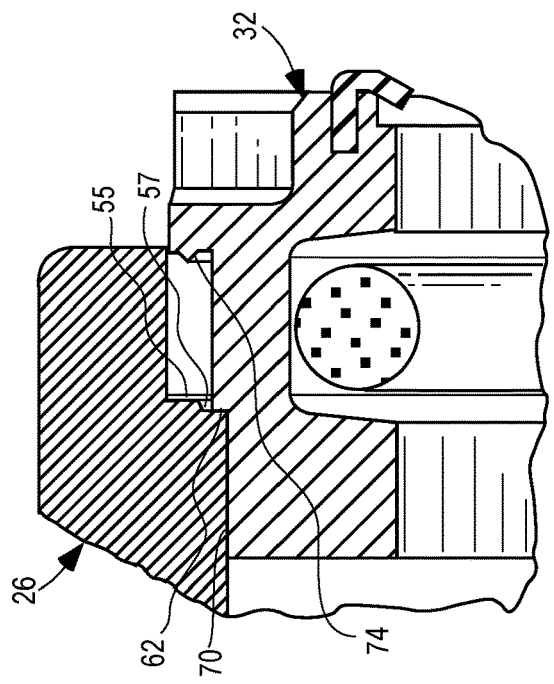
FIG. 10 is an enlarged cross-sectional view of the area circled in FIG. 9.
Figure 15:
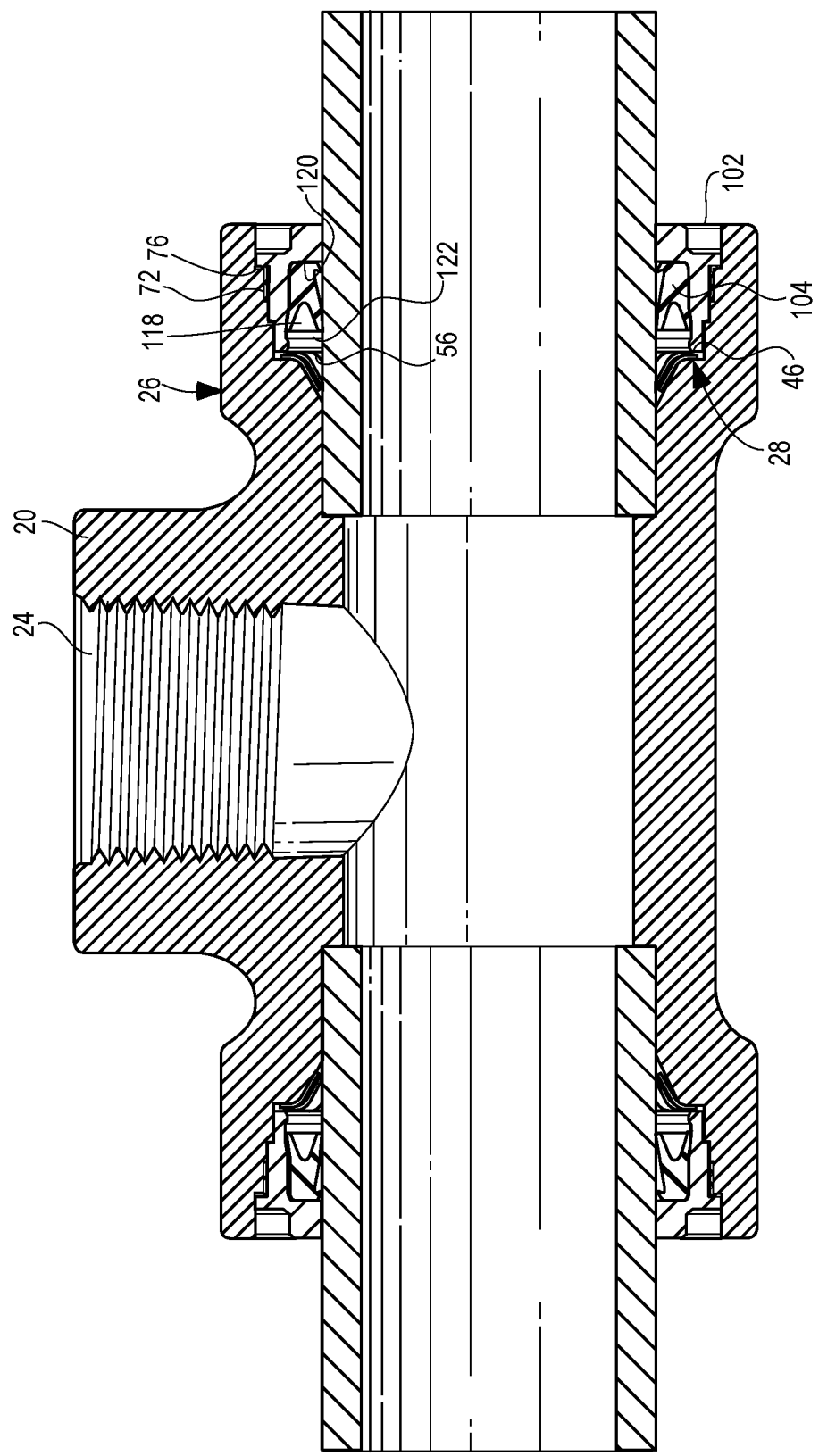
FIG. 15 is a cross-sectional view of the coupling of FIG. 13 taken along line 15-15 of FIG. 13.
Figure 16:
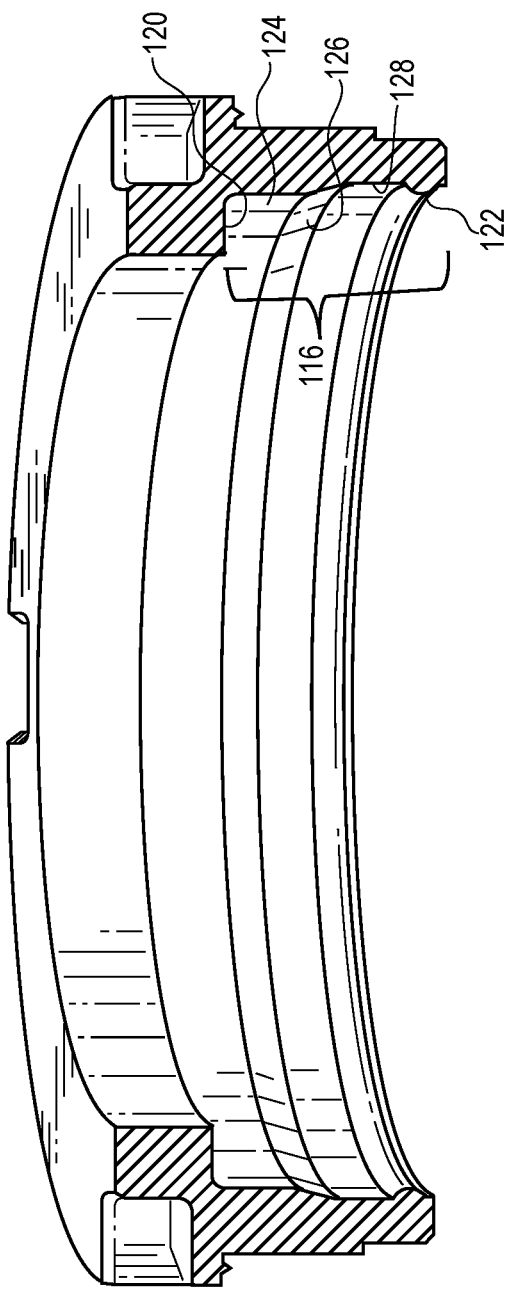
FIG. 16 is a perspective cross-sectional view of a cap of the coupling of FIG. 13.
Figure 17:
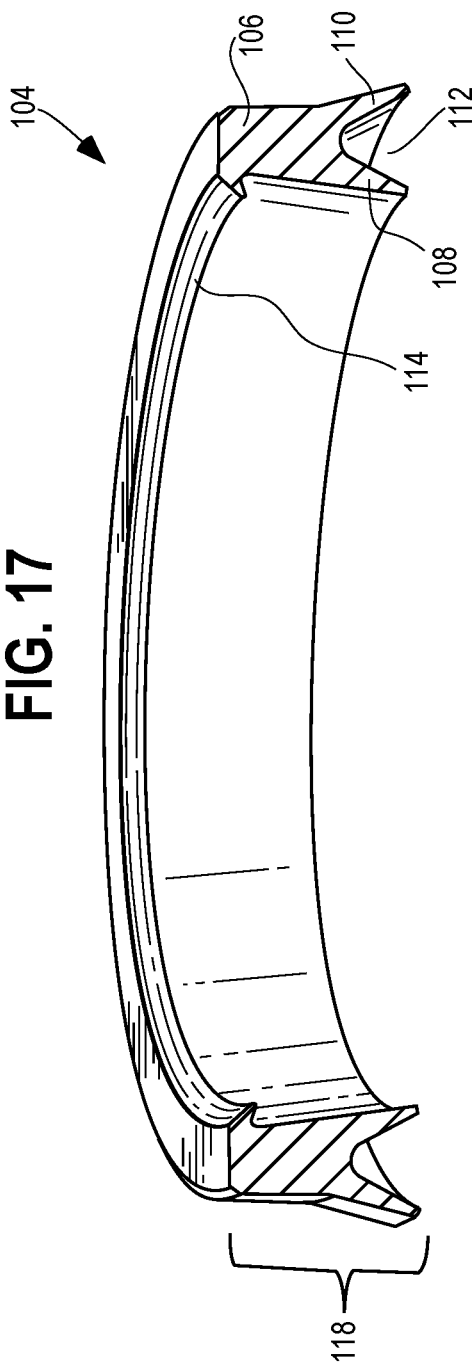
FIG. 17 is a perspective cross-sectional view of a seal of the coupling of FIG. 13.

As shown in FIG. 8, the ring portion 46 of the toothed ring 28 is planer. The teeth 48 are angled radially inward. The angled annular ring 42 of the body portion 26 aligns with the teeth 48 and allows the teeth 48 enough clearance to move outward upon insertion of a conduit so that the conduit can pass over the teeth 48. The clearance may also allow a tool to be inserted into the attachment system 22 around the conduit to shift the teeth 48 radially outward to release the conduit. The teeth 48 will engage the outer surface of the conduit due to the radially inward bias of the teeth 48. This engagement will cause the teeth 48 to grip an outer surface of the conduit upon attempted extraction of the conduit from the coupling 10. There is also a clearance between the cap and the conduit to allow a tool to be inserted into the attachment system. The clearance may be 0.013±0.005 inches.

Figure 4:
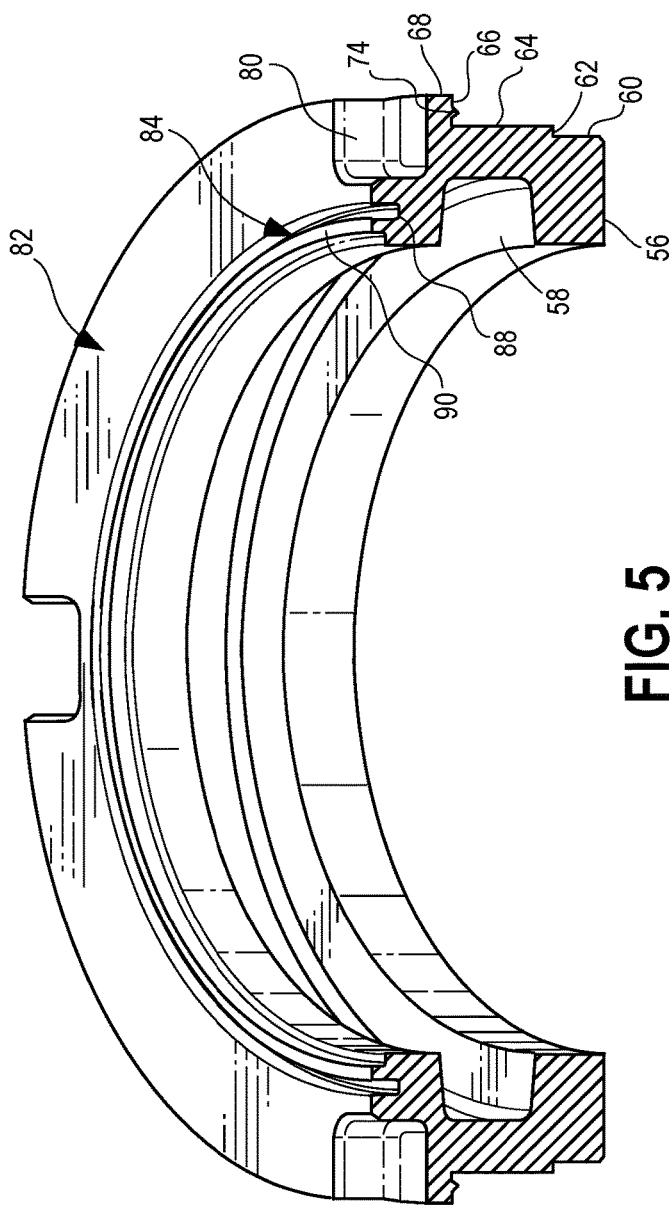
FIG. 4 is a perspective cross-sectional view of a cap of the coupling of FIG. 1.
Figure 5:
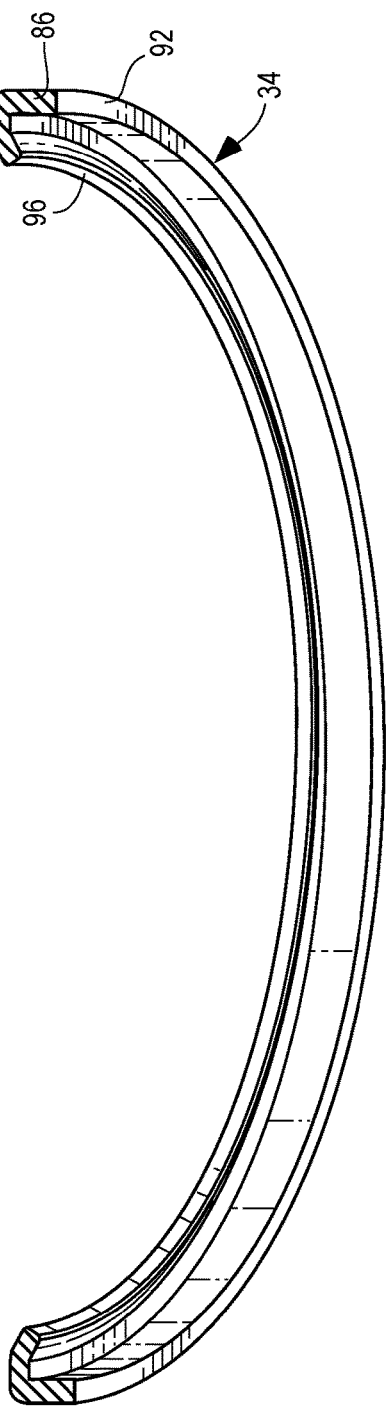
FIG. 5 is a perspective cross-sectional view of a wiper of the coupling of FIG. 1.

With reference to FIGS. 3 and 4, the cap 32 includes an inboard end surface 56 that faces the ring portion 46 of the toothed ring 28. The end surface 56 and the first annular ledge 44 of the body portion 26 captivate the ring portion 46 of the toothed ring 28 against axial movement. A gap between the inboard end surface 56 and the first annular ledge 44 may be slightly larger than that thickness of the ring portion 46 to allow the toothed ring 28 to rotate relative to the coupling 10. For example, the planar portion could have a thickness of around 0.015±0.005 inches and the additional clearance could be around 0.010±0.005 inches. This allows the conduit segments 14,18 or the coupling 10 to be rotated to properly orient the coupling 10 or components connected to the conduit segments 14,18. This assists installation and adjustment of irrigation components. The toothed ring 28 may be made of any material that provides sufficient structural integrity to secure a conduit in the coupling and that provides sufficient resiliency to bias to its normal static position. One such material is stainless steel.

The cap 32 defines an inner annular recess 58 that receives the seal 30. The seal 30 can have an annular form such as an o-ring. The inner annular recess 58 should provide sufficient space about the seal 30 so that the seal 30 can deform in this space to allow a conduit to pass into the body portion 26 without too much frictional resistance from the seal 30 but still maintaining a sufficient sealing force to seal an interface between the seal 30 and the conduit. For example, the inner annular recess 58 can have a rectangular cross-section while an o-ring seal can have a circular cross-section. This allows the o-ring to deform into the corners of the recess. The seal may be made of ethylene propylene diene monomers.

The cap 32 has an exterior stepped configuration that cooperates with the interior segments of the body portion 26 to attach and seal the cap 32 to the body portion 26 using a sonic or spin weld process. More specifically, FIG. 4 illustrates the cap 32 in a preassembled form. The exterior includes a first cylindrical segment 60 with a first annular riser 62, a second cylindrical segment 64 ending with a second annular riser 66 and a third cylindrical segment 68. The first cylindrical segment 60 has a diameter less than that of the second cylindrical segment 64. The second cylindrical segment 64 has a diameter less than a diameter of the third cylindrical segment 68. The cap 32 could be made of acrylonitrile butadiene styrene.

With reference to FIGS. 9-12, there is illustrated two primary stages of the welding process. In the first stage (FIGS. 9 and 10), the first annular riser 62 of the cap 32 starts overlapped with the inner portion 57 of the second annular ledge 54 of the body portion 26. A small gap 70 resides between the first cylindrical cap segment 50 of the body portion 26 and the first cylindrical segment 60 of the cap 32. The gap 70 provides a first flash trap. The gap could have a thickness of around 0.002±0.005 inches. As the cap 32 is brought into the body portion 26 during the sonic or spin weld operation, the overlapped material melts into the gap 70 and forms a first weld interface 72 (FIG. 12). The first weld interface could have a length of around 0.17±0.015 inches and a thickness of around 0.014±0.005 inches.

FIGS. 11 and 12 illustrate the second stage. The second annular riser 66 includes a face weld generator. The face weld generator is shown as an annular rib 74 with a triangular cross-section. The terminal edge of the rib 74 contacts the outer step 55 of the second annular ledge 54 and focuses energy at this interface. The inner step 57 of the second annular ledge 54 forms a second flash trap. As the cap 32 is brought further into the body portion 26 during the sonic or spin weld operation, the material of the rib 74 melts into the second flash trap and forms a second weld interface (FIG. 3) The cap 32 includes recesses 80 (FIGS. 3 and 4), such as four equally spaced recesses, that form drive lugs that are used during a spin weld process to turn the cap 32 while the body 26 is held in a jig.

In addition to a secure connection of the cap 32 to the body portion 26, the first and second weld interfaces 72 and 76 provide sealing so that fluid cannot pass around the exterior of the cap 32 to the outside of the coupling 10. While the secure connection is done with two weld interfaces, it could be done with only the first interface 72 or the second interface 76.

With reference to FIGS. 3 and 4, a top 82 of the cap 32 includes an annular recess 84 for attaching the wiper 34. More specifically, the wiper 34 includes an annular skirt 86 that fits into the annular recess 84. The wiper 34 can be attached in the recess 84 using a reverse taper mechanical interface. For example, the recess 84 can taper proceeding from a bottom 88 to an opening 90, and the skirt 86 can taper in the opposite direction, i.e., it can be wider at a terminal edge 92 and narrower at a base 94. The tapering can be switched as well. Alternatively, only the wiper 34 can be tapered and/or the wiper 34 can be glued in the annular recess 84 of the cap 32. As another alternative, the wiper could be attached using a combination of over molded bonding with compatible materials and some mechanical locking. For example, the cap (as well as the body) can be made of acrylonitrile butadiene styrene (ABS), and the wiper may be made of a material having propylene and ethylene propylene diene monomer (EPDM). The wiper 34 also may be made of thermoplastic elastomer material such as that available as MONPRENE 1566 (available from Teknor Apex Company). A wiper ring 96 extends radially inward and is angled inboard on the coupling 10. The wiper 34 also could be over-molded onto the cap 32.

FIGS. 13-18 illustrate an alternative embodiment of a coupling 100. The coupling 100 includes many of the same elements as those of the above-discussed coupling 10 and a discussion of them is not repeated here. The focus is on the new elements of this coupling 100. The elements that are the same will be labeled with the same reference numbers as the previous coupling 10.

The coupling 100 contains a different cap 102 and seal 104. The seal 104 includes an annular base 106 with an annular inner skirt 108 and an annular outer skirt 110 extending away from one another to from a pressure gap 112 between them. The seal 104 includes an annular wiper 114 extending inward from the base 106 to wipe a conduit being inserted into the coupling 100 and to seal against the conduit. For example, the length of the seal could be around 0.270±0.005 inches, the thickness of the skirts could be around 0.013±0.005 inches. The seal 104 could be made of ethylene propylene diene monomers.

The cap 102 includes an inner pocket 116 shaped to complement an exterior configuration 118 of the seal 104. The pocket 116 is defined on its outboard end by an annular stop wall 120 and on its inboard end by an annular rib 122. The rib 122 prevents the bottom of the seal outer skirt 110 from translating seal 104 out of position during installation of a pipe fitting. The pocket 116 includes a cylindrical base portion 124 adjacent the stop wall 120 that is configured to receive the base 106 of the seal 104. Adjacent to the base portion 124, the pocket 116 includes a conical portion 126 that receives the outer seal skirt 110, which forms an angle with the base 106. Next, and adjacent to the annular rib 122, the pocket 116 includes another cylindrical portion 128 that can receive the outer seal skirt 110. The cap 102 could be made of acrylonitrile butadiene styrene.

As with coupling 10, the seal 104 is outboard of the gripping or toothed ring 28 in the coupling 110. This order prevents the gripping ring 28 from damaging the sealing surface of the conduit. As a conduit is inserted into the coupling 110, it first engages the wiper 114, and then the inner seal skirt 108. The inner seal skirt 108 has a normal outward bias but is able to flex outward into the pressure gap 112 when in contact with the conduit. When the coupling is under pressure due to fluid in the conduit, the fluid will fill the pressure gap 112 and cause the inner skirt seal 108 to interface with the conduit under more pressure, which provides greater sealing.

The cap 102 can be attached and sealed to the body portion 26 in the same manner as discussed above for the coupling 10.

Figure 18:
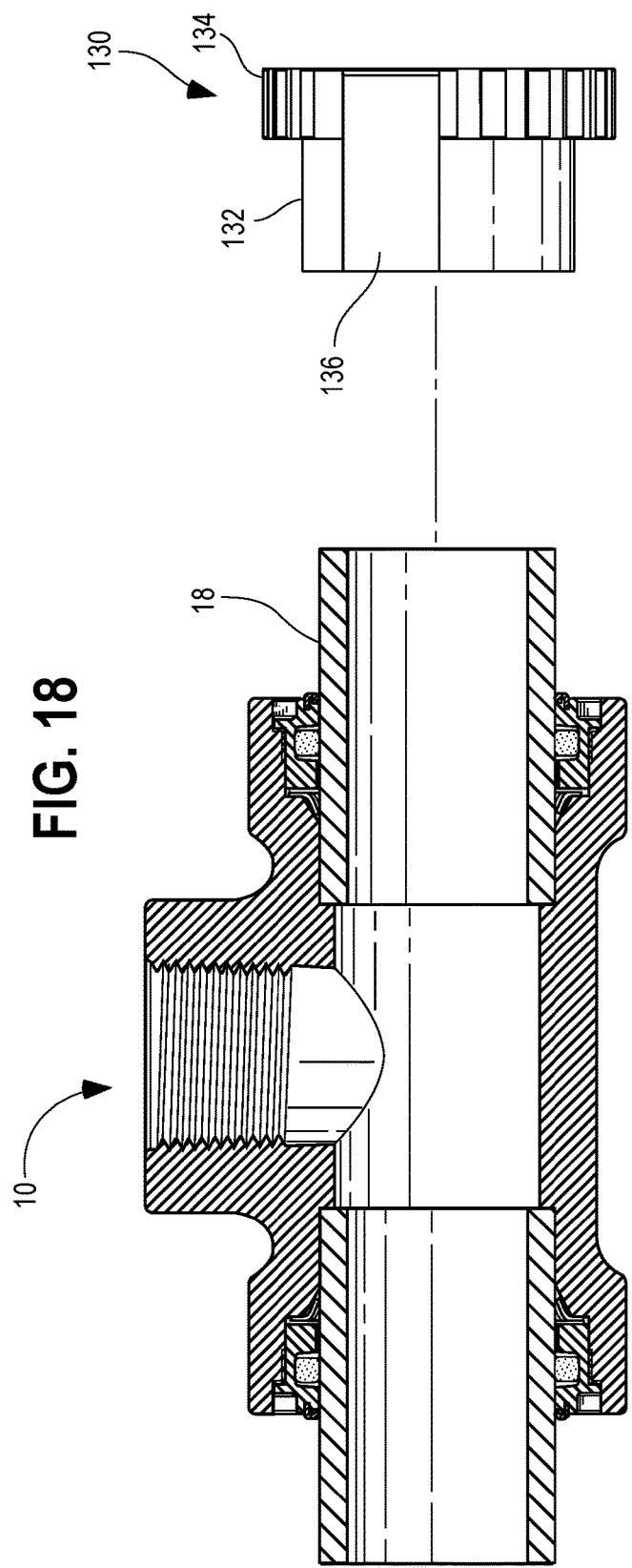
FIG. 18 is a perspective view of a tool for removing a conduit secured in the coupling of FIG. 1, which is shown in cross-section.
Figure 19:
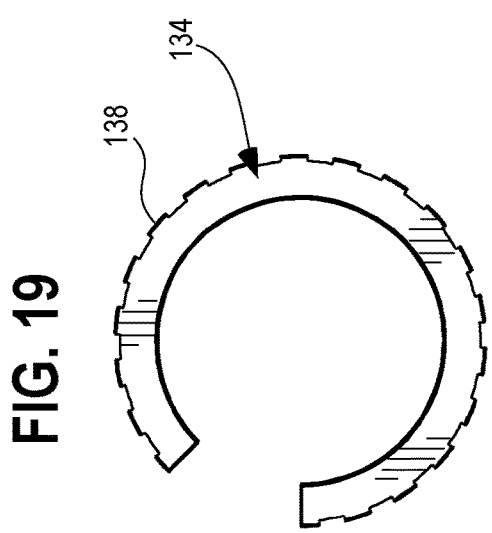
FIG. 19 is a top plan view of the tool of FIG. 18.

In FIGS. 18 and 19, there is illustrated a tool 130 used to remove a conduit segment 18 secured in the coupling 10. The tool 130 is illustrated with coupling 10 but can also be used with coupling 100. The tool 130 includes a split cylinder 132 and ring 134. A gap 136 between edges of the split cylinder 132 and the ring 134 enable the tool 130 to be snapped over the conduit segment 18. Once the tool 130 is snapped over the conduit segment 18, it is inserted into the coupling 10. The split cylinder 132 has sufficient length to engage the teeth 48 of the toothed ring 28 to move the teeth 48 out of engagement with the conduit segment 18. Once the teeth are removed from engaging the conduit segment 18, the conduit segment 18 and the coupling 10 can be separated from one another. The ring 134 includes knurling 138 to assist a user in gripping the tool 130.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the technological contribution. The actual scope of the protection sought is intended to be defined in the following claims.

What is claimed is:

1. A coupling comprising:
    a body defining at least one coupling opening;
    a gripping ring fitted into the opening;
    a cap secured in the opening outboard of the gripping ring; and
    a seal held by the cap outboard of the gripping ring, the seal having an inboard end portion and an outboard end portion,
    wherein the seal includes a wiper projecting from the outboard end portion to engage a conduit inserted into the at least one coupling opening,
    wherein the wiper has a first surface and a second surface, wherein the first surface is wider than the second surface such that the wiper projects at an angle from the outboard end portion in an inboard direction.

2. The coupling of claim 1, wherein the cap is configured to engage the seal so that the seal can deform during engagement by a conduit inserted into the at least one coupling opening.

3. The coupling of claim 2, wherein the cap defines a wall positioned radially outward of the seal defining an annular pocket to hold the seal.

4. The coupling of claim 3, wherein the seal is an annular seal with a u-shaped configuration, the u-shaped configuration having a base portion and two arm portions extending from the base portion, the base portion and one arm portion configured to be received in the annular pocket and the other arm portion configured to engage and deflect radially during engagement by a conduit inserted into the at least one coupling opening.

5. The coupling of claim 4, wherein the two arm portions define a volume therebetween to receive pressurized fluid to force the other arm portion configured to engage a conduit inserted into the at least one coupling into a stronger sealing engagement therewith.

6. The coupling of claim 4, wherein the wiper is a third arm portion of the seal that is spaced outboard of the first two arm portions.

7. The coupling of claim 1, wherein the body and the cap captivate the gripping ring against axial movement.

8. The coupling of claim 7, wherein enough space exists between the body and the cap captivating the gripping ring so that the gripping ring is free to rotate relative to the body.

9. The coupling of claim 1, wherein the wiper comprises an annular configuration.

10. The coupling of claim 1, wherein the seal further comprises an arm portion separate from the wiper that engages the conduit inserted into the at least one coupling opening.

11. The coupling of claim 10, wherein the arm portion projects from the inboard end portion of the seal.

12. A coupling comprising:
    a body defining at least one coupling opening;
    a gripping ring fitted into the opening;
    a cap secured in the opening outboard of the gripping ring; and
    a seal held by the cap outboard of the gripping ring, wherein the gripping ring is sandwiched directly between the body and the cap, and wherein the seal has an inboard end portion and an outboard end portion and includes a wiper projecting from the outboard end portion to engage a conduit inserted into the at least one coupling opening, the wiper having a first surface and a second surface, wherein the first surface is longer than the second surface.

13. The coupling of claim 12, wherein the seal is an annular seal with a u-shaped configuration, the u-shaped configuration having a base portion and two arm portions extending from the base portion, wherein one of the two arm portions is configured to engage and deflect radially during engagement by a conduit inserted into the at least one coupling opening.

14. The coupling of claim 12, wherein enough space exists between the body and the cap captivating the gripping ring so that the gripping ring is free to rotate relative to the body.

* * * * *